(12) United States Patent
Xu et al.

(10) Patent No.: US 9,207,950 B2
(45) Date of Patent: Dec. 8, 2015

(54) METHOD AND DEVICE FOR DISTINGUISHING BETWEEN COLD BOOT AND WARM BOOT AND SETTING A DATA TO MAKE IT FAIL TO DETERMINE THE BOOT TYPE AS WARM BOOT

(75) Inventors: Hao Xu, Beijing (CN); Xiao Lin, Beijing (CN); BenDong Chen, Beijing (CN)

(73) Assignee: Thomson Licensing (FR)

( * ) Notice: Subject to any disclaimer, the term of this patent is extended or adjusted under 35 U.S.C. 154(b) by 148 days.

(21) Appl. No.: 13/988,018

(22) PCT Filed: Sep. 15, 2011

(86) PCT No.: PCT/CN2011/079688
§ 371 (c)(1),
(2), (4) Date: May 16, 2013

(87) PCT Pub. No.: WO2012/071926
PCT Pub. Date: Jun. 7, 2012

(65) Prior Publication Data
US 2013/0238887 A1     Sep. 12, 2013

(30) Foreign Application Priority Data

Nov. 29, 2010   (WO) ............... PCT/CN2010/001912

(51) Int. Cl.
*G06F 9/44*   (2006.01)
*G06F 11/14*  (2006.01)

(52) U.S. Cl.
CPC .......... *G06F 9/4401* (2013.01); *G06F 11/1441* (2013.01)

(58) Field of Classification Search
CPC ...................................................... G06F 9/4401
USPC ............................................................. 713/2
See application file for complete search history.

(56) References Cited

U.S. PATENT DOCUMENTS

| | | | |
|---|---|---|---|
| 5,634,079 A * | 5/1997 | Buxton | 710/72 |
| 5,748,940 A | 5/1998 | Angelo et al. | |
| 5,935,242 A | 8/1999 | Madany et al. | |
| 5,960,195 A | 9/1999 | Kang et al. | |
| 6,085,299 A * | 7/2000 | Angelo et al. | 711/163 |
| 6,711,675 B1 * | 3/2004 | Spiegel et al. | 713/2 |

(Continued)

FOREIGN PATENT DOCUMENTS

| | | |
|---|---|---|
| CN | 1540503 | 10/2004 |
| CN | 101008900 | 8/2007 |

(Continued)

OTHER PUBLICATIONS

Search Report dated Dec. 22, 2011.

(Continued)

*Primary Examiner* — Suresh Suryawanshi
(74) *Attorney, Agent, or Firm* — Jack Schwartz & Associates, PLLC

(57) ABSTRACT

It is provided a method for distinguishing between cold boot and warm boot of a device, wherein the device comprises a volatile memory containing a flag used for indicating boot type, the method comprises the step of determining boot type by reading the flag; wherein, the method further comprises upon detection of a message indicating occurrence of power outage, setting data of the volatile memory in such a way that make the device fail to determine the boot type as warm boot.

14 Claims, 2 Drawing Sheets

(56) References Cited

U.S. PATENT DOCUMENTS

| | | |
|---|---|---|
| 7,383,431 B2 * | 6/2008 | Takamizawa et al. ............ 713/2 |
| 7,574,590 B2 * | 8/2009 | Moore et al. ...................... 713/1 |
| 7,805,637 B2 | 9/2010 | Van Haegendoren et al. |
| 8,006,080 B2 * | 8/2011 | Yamaji .............................. 713/2 |
| 2001/0047473 A1 * | 11/2001 | Fallon ............................... 713/2 |
| 2007/0260865 A1 | 11/2007 | Kuo |
| 2008/0304825 A1 | 12/2008 | Mahony et al. |
| 2009/0172350 A1 | 7/2009 | Norman |

FOREIGN PATENT DOCUMENTS

| | | |
|---|---|---|
| EP | 0 984 612 | 3/2000 |
| EP | 1372068 | 12/2003 |
| EP | 1562112 | 8/2005 |
| JP | H8249243 | 9/1996 |
| JP | H1091289 | 4/1998 |
| JP | 200470678 | 3/2004 |
| JP | 2004070678 | 3/2004 |
| WO | WO2004/040891 | 5/2004 |
| WO | WO2007050176 | 5/2007 |

OTHER PUBLICATIONS

Anonymous, "The Booting Process of the PC", http://www.comptechdoc.org/hardware/pc/pcboot.html, Jan. 23, 2002, pp. 1-4.

* cited by examiner

METHOD AND DEVICE FOR DISTINGUISHING BETWEEN COLD BOOT AND WARM BOOT AND SETTING A DATA TO MAKE IT FAIL TO DETERMINE THE BOOT TYPE AS WARM BOOT

This application claims the benefit, under 35 U.S.C. §365 of International Application PCT/CN2011/079688, filed Sep. 15, 2011, which was published in accordance with PCT Article 21(2) on Jun. 7, 2012 in English and which claims the benefit of International Patent application No. PCT/CN2010/001912, filed Nov. 29, 2010.

TECHNICAL FIELD

The present invention relates to electronic device, and more particularly, relates to a method and a device for distinguishing between cold boot and warm boot.

BACKGROUND

Simple network management protocol (SNMP) is a UDP-based network protocol. It is used mostly in network management systems to monitor network-attached devices for conditions that warrant administrative attention. SNMP is a component of the Internet Protocol Suite as defined by the Internet Engineering Task Force (IETF). It consists of a set of standards for network management, including an application layer protocol, a database schema, and a set of data objects. SNMP exposes management data in the form of variables on the managed systems, which describe the system configuration. These variables can then be queried (and sometimes set) by managing application.

In typical SNMP use, one or more administrative computers called managers have the task of monitoring or managing a group of hosts or devices within a network. Each managed device runs, at all times, a module called an agent which reports information via SNMP to the manager. Specifically, the information is reported via SNMP protocol data units (PDUs). Among these PDUs, a trap is a type of PDU used to report an alert or other asynchronous event about a managed device.

When the SNMP is deployed on a gateway, the trap notification can be used report, e.g. cold boot, warm boot, managed Ethernet switch change, linkup, linkdown, etc.

However, when deploying the SNMP on the gateway, it's found that the gateway sometimes cannot correctly distinguish between cold boot and warm boot.

SUMMARY

According to an aspect of present invention, it is provided a method for distinguishing between cold boot and warm boot of a device, wherein the device comprises a volatile memory containing a flag used for indicating boot type, the method comprises the step of determining boot type by reading the flag; wherein, the method further comprises upon detection of a message indicating occurrence of power outage, changing data of the volatile memory in such a way that make the device fail to determine the boot type as warm boot.

According to another aspect of present invention, it is provided a device for distinguishing between cold boot and warm boot. The device comprises a volatile memory 302 for containing a flag used for indicating boot type; a power outage capturing module 301 for capturing a message indicating occurrence of power outage; and a processor 303 for determining boot type by reading the flag, and responsive to capture of the message indicating occurrence of power outage by the power outage capturing module 301, changing data of the volatile memory 302 in such a way that make the processor 303 fail to determine the boot type as warm boot.

According to the aspect of present invention, the device can correctly distinguish between cold boot and warm boot.

It is to be understood that more aspects and advantages of the invention will be found in the following detailed description of the present invention.

BRIEF DESCRIPTION OF THE DRAWINGS

The accompanying drawings, which are included to provide a further understanding of the, illustrate embodiments of the invention together with the description which serves to explain the principle of the invention. Therefore, the invention is not limited to the embodiments. In the drawings.

DETAILED DESCRIPTION

Figure 1:
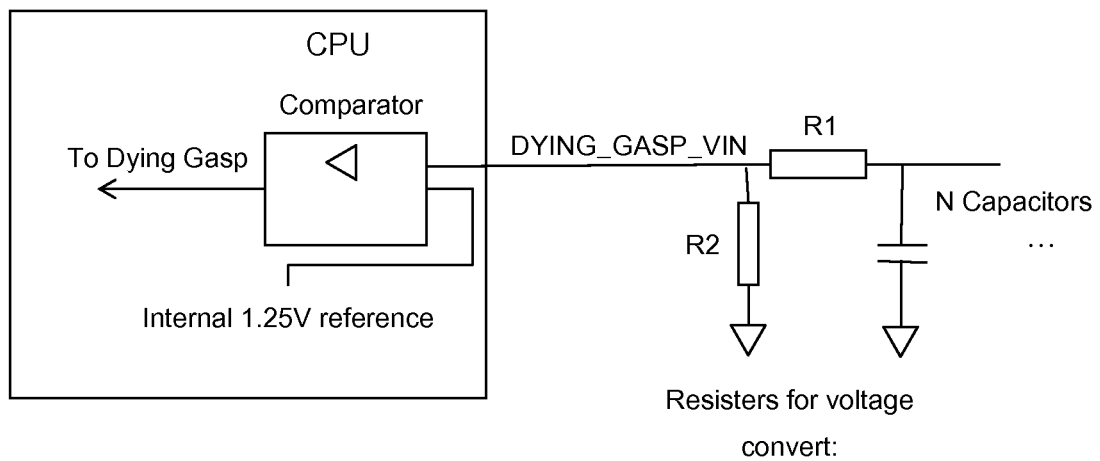
FIG. 1 is a diagram showing the hardware connection according to an embodiment of present invention.

An embodiment of the present invention will now be described in detail in conjunction with the drawings. In the following description, some detailed descriptions of known functions and configurations may be omitted for clarity and conciseness.

A cold boot (also known as hard reboot, cold reboot or cold start) is when power to a device is cycled (turned off and then on) or a special reset signal to the processor is triggered. A cold boot may be caused by power failure, which is caused by accident, or deliberately as the user wants to resume a system from state of system freeze or critical error.

A warm boot (also known as soft reboot or warm reboot) is restarting a computer under software control without removing power. It usually, though not always, refers to an orderly shutdown and restarting of the machine without removing power.

In some systems, each time a device boots up, it will determine which boot among cold boot and warm boot it is and notify a SNMP managing device of the boot type of this boot event via SNMP trap.

As an example, in order to assist the judgment of the boot type, a flag called selftest_flag is set in an allocated area called prozone in a volatile memory (such as RAM, Random Access Memory) of a gateway. The prozone is an allocated memory area for storing system-related parameters, e.g. selftest_flag. Besides, the prozone employs cyclic redundancy check (CRC) technique in this example, which means the prozone contains two parts; one part contains data of the system-related parameters and the other part contains the CRC checksum of the data of the system-related parameters. So the data accuracy of the prozone can be guaranteed. In this example, a gateway may have one or more external ports for connecting the Internet service provider and one or more internal ports for connecting user devices. The external port may comprise one or more of xDSL (adsl, vdsl, shdsl etc.), Ethernet port, GPON (gigabit-capable passive optical network), UMTS (universal mobile telecommunications system) etc. The internal port may comprise one or more of Ethernet port and wifi (802.11). A solution for judging the cold boot and warm boot is as below: When the gateway boots up in cold boot mode, the gateway will fail to read the selftest_flag because the data in the volatile memory loses after previous power off. So the gateway creates the selftest_flag in the volatile memory and set the selftest_flag to 1 indicative of the cold boot. When the gateway boots up in warm boot mode, the gateway changes the selftest_flag to 0 indicative of the warm boot. The reason why the gateway does not need to create the selftest_flag in warm boot mode is that the volatile memory is kept being powered during the warm boot. So the gateway can tell which boot type it is by reading the selftest_flag. In this example, we use the prozone to containing all system-related parameters. So when the gateway boots up, it checks the CRC checksum of the prozone. If the checksum is invalid which means the volatile memory is not provided with powered before the boot, the gateway would recreate the prozone (including selftest_flag) and set the selftest_flag to 1. Otherwise, the gateway will change the selftest_flag to 0 because the volatile memory is provided with power before the boot. The gateway reads this flag, if it's 1, it sends out a cold boot trap to the managing system, else a warm boot trap is sent out.

However, the data remanence property of RAM makes prozone (of course including selftest_flag) readable in the seconds to minutes after the power has removed. Because the data of prozone is not lost, when the device is supplied with power and turned on, the prozone is still checked valid. This results in that the device mistakes the cold boot for the warm boot, which is not consistent with the fact.

The present invention takes advantage of dying gasp for assisting to correctly distinguish between cold boot and warm boot.

Dying Gasp is a message (or signal) sent by the customer premises equipment (CPE) DSL device to the digital subscriber line access multiplexer (DSLAM) to indicate occurrence of power outage when a power outage occurs. Herein, a power outage (also known as a power cut, power failure, power loss, or blackout) is a short-term or long-term loss of the electric power to an area. A DSL interface with dying gasp must derive power for a brief period from another source so that the message can be sent without external power. The dying gasp message will end the session and a new session will be able to be made as soon as power returns and the modem retrains. Dying Gasp is referenced in section 7.1.2.5.3 of ITU-T Recommendation G.991.2 (12/2003) as the Power Status bit.

FIG. 1 is a diagram showing the hardware connection according to an embodiment of present invention. When the gateway is power off, the Broadcom chipset, e.g. BCM96358, BCM96368, BCM96362 etc., would issue a Dying Gasp interrupt. The Dying Gasp input is compared to an internal 1.25V reference voltage. This 1.25V reference is derived from a high-precision, on-chip, band gap reference. It is stable to 2% across the entire temperature, process and voltage range. The temperature range is 0° C. to 70° C. Tolerance is 1%. The band gap is not actually dependent on voltage levels and is, therefore, stable across the ±5% voltage range. The hysteresis of the comparator is set to approximately ±30 mV. Dying gasp is asserted when the sense voltage on the DYING_GASP_IN input falls below 1.215V and is deasserted when the input rises above 1.282V. Tie to 2.5V when not used.

Figure 2:
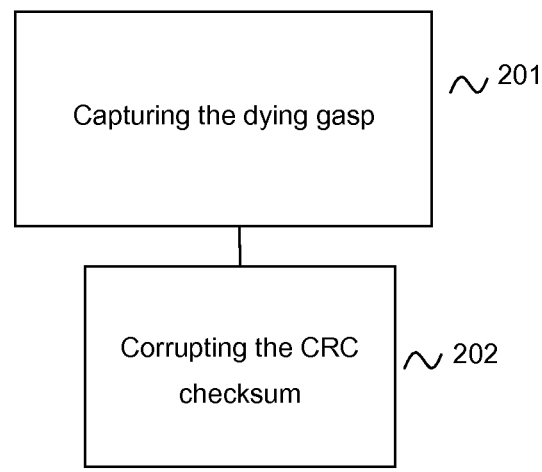
FIG. 2 is a flow chart showing a method for assisting for correctly distinguishing cold boot and warm boot according the embodiment of present invention.

FIG. 2 is a flow chart showing a method for assisting for correctly distinguishing cold boot and warm boot according to the present embodiment.

In the step 201, the device captures the dying gasp. For example, when the power of gateway is removed either accidentally or deliberately, the Broadcom chipset would issue a Dying Gasp interrupt. The dying gasp interrupt handler of the device will capture the dying gasp interrupt.

In the step 202, the device corrupts the CRC checksum of the prozone. The purpose is to make CRC checksum invalid. For example, in order to corrupt the checksum, the Dying Gasp interrupt handler increases the CRC checksum of the prozone by 1. Then when the gateway is power up, the CRC checksum of the prozone is checked invalid; and the device is configured to initialize the prozone, and in the initialization the selftest flag is set to 1, which means that the gateway has cold boot.

After the gateway boots up, the snmp module reads the selftest flag, if this flag is set to 1, the snmp will send out a cold start trap to the target pc. Then the target pc knows the gateway boots on a power on.

According to a variant of present invention, the principle of present invention can be applied to other devices with dying gasp mechanism for correctly distinguishing cold boot and warm boot, e.g. set top box, because the RAM of these devices still has data remanence property.

According to the present embodiment, it uses the selftest_flag to determine which boot type it is. The principle is that the data in the volatile memory written before a boot is still readable after the boot if the boot is the warm boot, and not readable if it's the cold boot. And in order to eliminate the wrong judgment caused by remanence, the device needs to, when power outage occurs, change the data so as to make the gateway fail to read the data or fail to determine the boot as warm boot. Even if the data is still readable when the gateway boots after the power outage, the gateway will know the boot is the cold boot other than the warm boot. As shown in above example, the change of data can be to corrupt the prozone or to corrupt the selftest_flag.

In this example, the selftest_flag is placed in the prozone, and by corrupting the CRC checksum part of the prozone upon capture of dying gasp, the device can correctly determine the cold boot, which is otherwise in the prior art solution possibly mistaken for warm boot. However, according to a variant, the device can corrupt the data of selftest_flag other than corrupting the data of the CRC checksum. In addition, according to another variant, the selftest_flag is independently set in the memory, and upon capture of the dying gasp, the value of the selftest_flag is set to 1.

Figure 3:
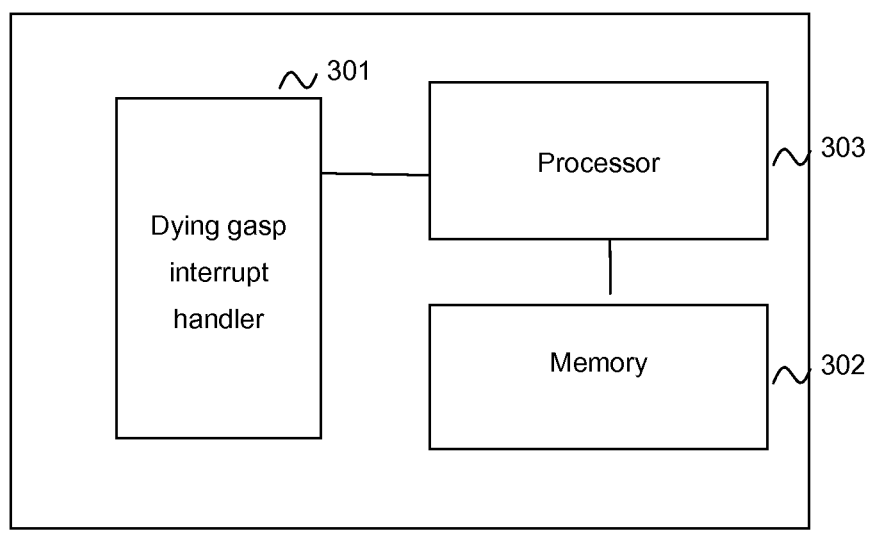
FIG. 3 is a block diagram showing a device for distinguishing between cold boot and warm boot according to the embodiment of present invention.

FIG. 3 is a block diagram showing a device for distinguishing between cold boot and warm boot according to the embodiment of present invention. The device comprises a dying gasp interrupt handler 301, a processor 303 and a memory 302. The memory 302 is used to store an independent selftest_flag or a prozone containing the selftest_flag. The dying gasp interrupt handler 301 is used to capture the dying gasp interrupt indicative of occurrence of power outage (the dying gasp interrupt triggers the transmission of dying gasp message) when power outage occurs, and notify the processor 303 of the capture. The processor 303 is used to determine whether a boot is cold boot or warm boot, and responsive to the notification of the capture modify the data of selftest_flag or data of the prozone, which will make the processor 303 determine a boot as cold boot. The data modification can be as follow. If an independent selftest_flag is used, the data of selftest_flag is modified to a value indicative of cold boot; if a prozone is used, the processor 303 can modified the data of selftest_flag or data of prozone checksum to make the prozone checksum invalid.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for distinguishing between cold boot and warm boot of a device, wherein the device comprises a volatile memory containing a flag used for indicating boot type, the method comprises determining, by a processor, boot type by reading the flag; further comprising, upon detection of a message indicating occurrence of power outage, setting data of the volatile memory so the device fails to determine the boot type as warm boot.

2. The method of claim 1, wherein the setting step further comprises setting the data of the flag to a value indicative of cold boot.

3. The method of claim 2, further comprising, upon failure to read the flag, creating the flag and setting the flag to a value indicative of cold boot.

4. The method of claim 1, wherein the volatile memory contains a data area consisting of a first part comprising the flag and a second part being a cyclic redundancy check (CRC) checksum of the data of the first part, and the setting step further comprises setting the data of the data area to make the CRC of the data area invalid.

5. The method of claim 4, further comprising creating the data area including the flag and setting the flag to a value indicative of cold boot when the CRC of the data are checked as invalid.

6. A device for distinguishing between cold boot and warm boot, comprising a volatile memory for containing a flag used for indicating boot type; a power outage capturing module for capturing a message indicating occurrence of power outage; and a processor for determining boot type by reading the flag, and responsive to capture of the message indicating occurrence of power outage by the power outage capturing module, the power outage capturing module sets data of the volatile memory whereby the processor does not determine the boot type as warm boot.

7. The device of claim 6, wherein the power outage capturing module sets the data of the flag to a value indicative of cold boot upon capture of the message indicating occurrence of power outage.

8. The device of claim 7, wherein the processor creates the flag and sets the flag to a value indicative of cold boot if unable to read the flag.

9. The device of claim 6, wherein the volatile memory contains a data area consisting of a first part comprising the flag and a second part being a cyclic redundancy check (CRC) checksum of the data of the first part, and the power outage capturing module sets the data of the data area to make CRC of the data area invalid upon detection of a dying gasp interrupt.

10. The device of claim 9, wherein the processor creates the data area including the flag and setting the flag to a value indicative of cold boot when the CRC of the data are checked as invalid.

11. A method for distinguishing between cold boot and warm boot of a device, comprising:
reading, by a processor, a flag in a volatile memory for indicating boot type;
determining, by the processor, boot type based upon the flag;
upon detection of a message indicating occurrence of power outage, setting the flag to a value indicative of a cold boot.

12. The method of claim 11, further comprising creating the flag and setting the flag to a value indicative of cold boot, upon failure to read the flag.

13. The method of claim 11, wherein the volatile memory contains a data area consisting of a first part comprising the flag and a second part being a cyclic redundancy check (CRC) checksum of the data of the first part, and setting the flag includes setting the data of the data area to make the CRC of the data area invalid upon detection of a dying gasp interrupt.

14. The method of claim 13, further comprising creating the data area including the flag and setting the flag to a value indicative of cold boot when the CRC of the data are checked as invalid.

* * * * *